May 6, 1958 — W. H. RICHARDS — 2,833,179

SLIDE PROJECTOR

Filed Jan. 17, 1956 — 5 Sheets-Sheet 1

INVENTOR.
WILLIAM H. RICHARDS
BY Wade Koontz
Paul M. Palmer
ATTORNEYS

May 6, 1958 W. H. RICHARDS 2,833,179
SLIDE PROJECTOR
Filed Jan. 17, 1956 5 Sheets-Sheet 3

INVENTOR.
WILLIAM H. RICHARDS
BY
ATTORNEYS

United States Patent Office 2,833,179
Patented May 6, 1958

2,833,179

SLIDE PROJECTOR

William H. Richards, Dayton, Ohio

Application January 17, 1956, Serial No. 559,750

5 Claims. (Cl. 88—27)

(Granted under Title 35, U. S. Code (1952), sec. 266)

The invention described herein may be manufactured and used by or for the United States Government for governmental purposes without payment to me of any royalty thereon.

This invention relates to a slide transport apparatus for slide projectors, and more particularly, to a rotary slide transport mechanism of stereo-slide carriers of a magazine type as disclosed and claimed in my copending application Serial No. 413,732, filed March 2, 1954, of which the present application is an improvement thereof.

The novel stereo-slide transport apparatus constructed in accordance with the present invention is particularly characterized by its simplicity of construction requiring only a small number of parts for automatically advancing the slides into a projection position thereby reducing the possibility of malfunction to a minimum, and providing a highly efficient and economically constructed slide transport apparatus.

The present invention, also, provides a slide holding apparatus wherein the slides once placed in the apparatus in proper sequence there can be no slide mix-up during projection, slides projected backwards, breakage of slides or dirt on slides necessitating sorting, cleaning and checking of the slides for each showing.

Another purpose of the present invention is to provide a slide holding apparatus wherein the slides successively placed in the projection position are automatically aligned requiring no adjustments whatsoever of the projector lenses so as to prevent eye strain.

Moreover, the present invention provides a slide holding apparatus which may be used as a permanent storage container for slides and for lectures on tape or written for verbal delivery during projection of the slides, always available for use thereby saving much time and confusion, and assuring proper presentation.

According to the present invention, the slide transport apparatus comprises a slide carrying magazine mounted for rotation, a stationary container mounted in a concentric relation to the magazine, and a novel slide lifting device arranged to be automatically operated to successively place stereo-slides in a projection position and replace the slides in the magazine after projection.

These and other features of the present invention are described in detail below in connection with the accompanying drawings, in which.

Figure 1:
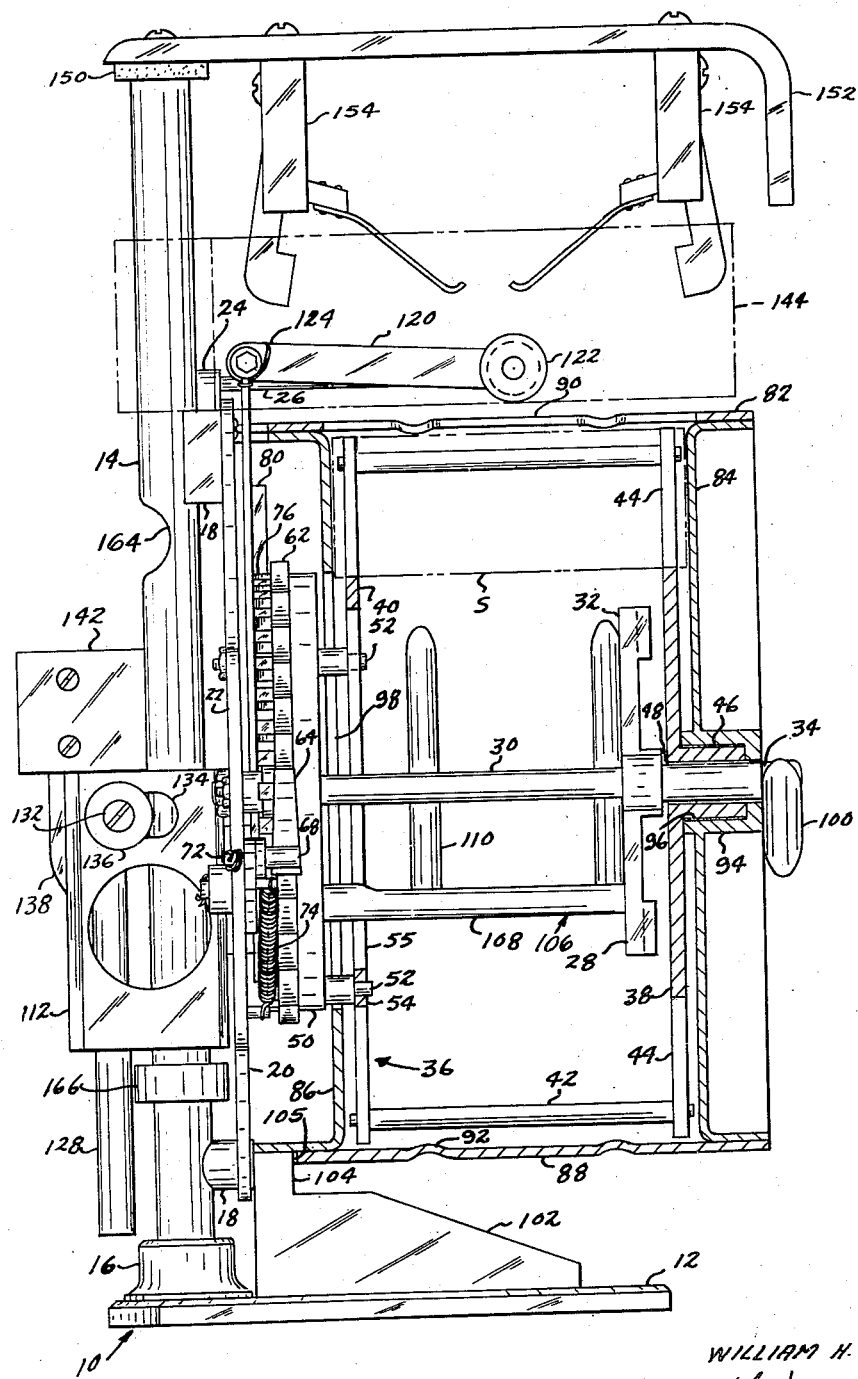
Figure 1 is a left side elevation of a slide transport apparatus embodying the present invention, with certain of the parts shown in section.

Referring now in detail to the drawings, wherein like numerals designate like parts throughout the several views, the embodiment of the slide transport apparatus of the present invention illustrated in the drawings comprises a support stand 10 consisting of a platform 12 and an upright shaft 14 secured non-rotatively to the platform 12 by being received in a socket 16 integral with the platform 12.

Figure 2:
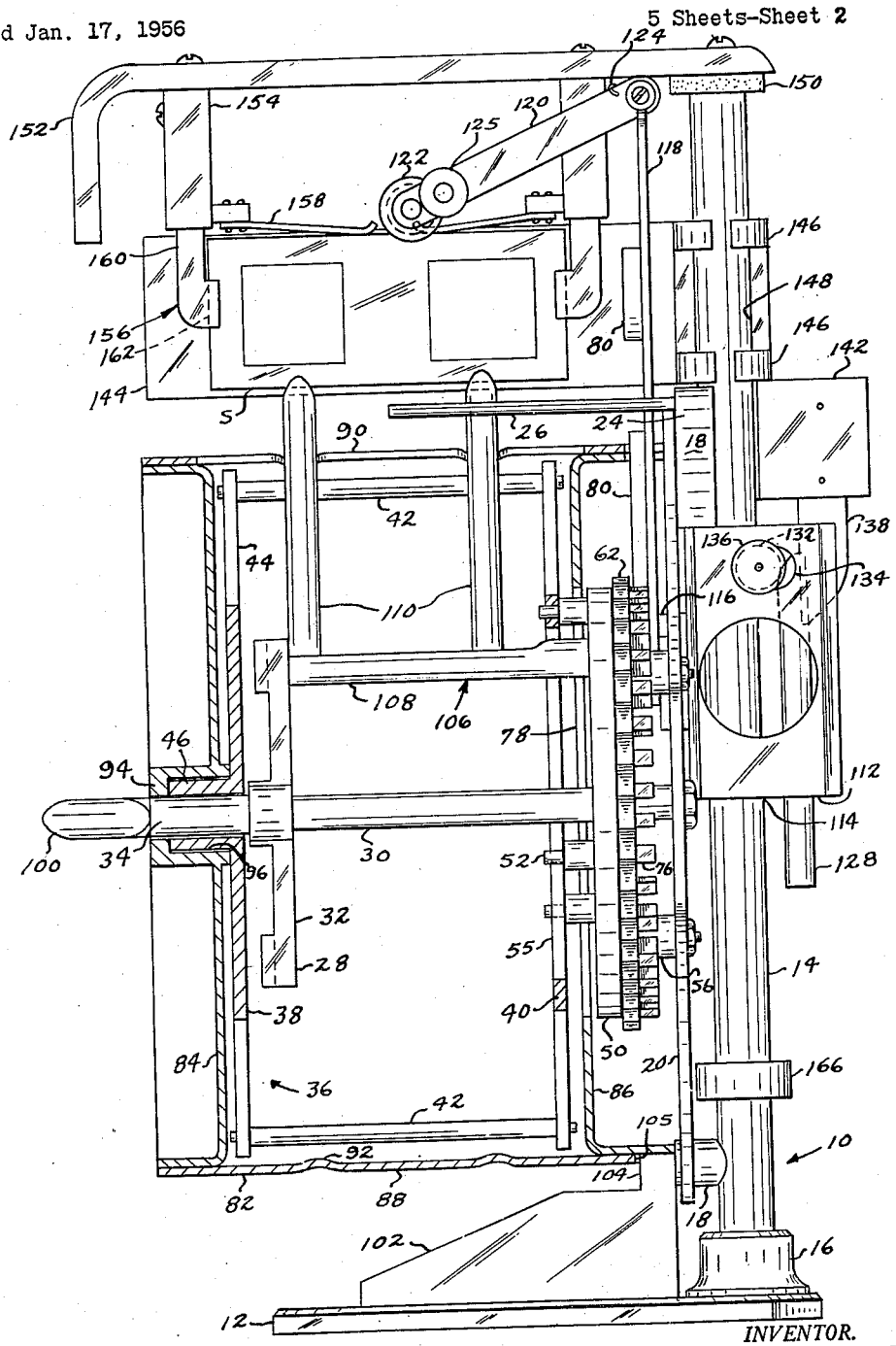
Figure 2 is a right side elevation of the slide transport apparatus shown in Figure 1, but with certain of the parts shown in a different operating position.
Figure 3:
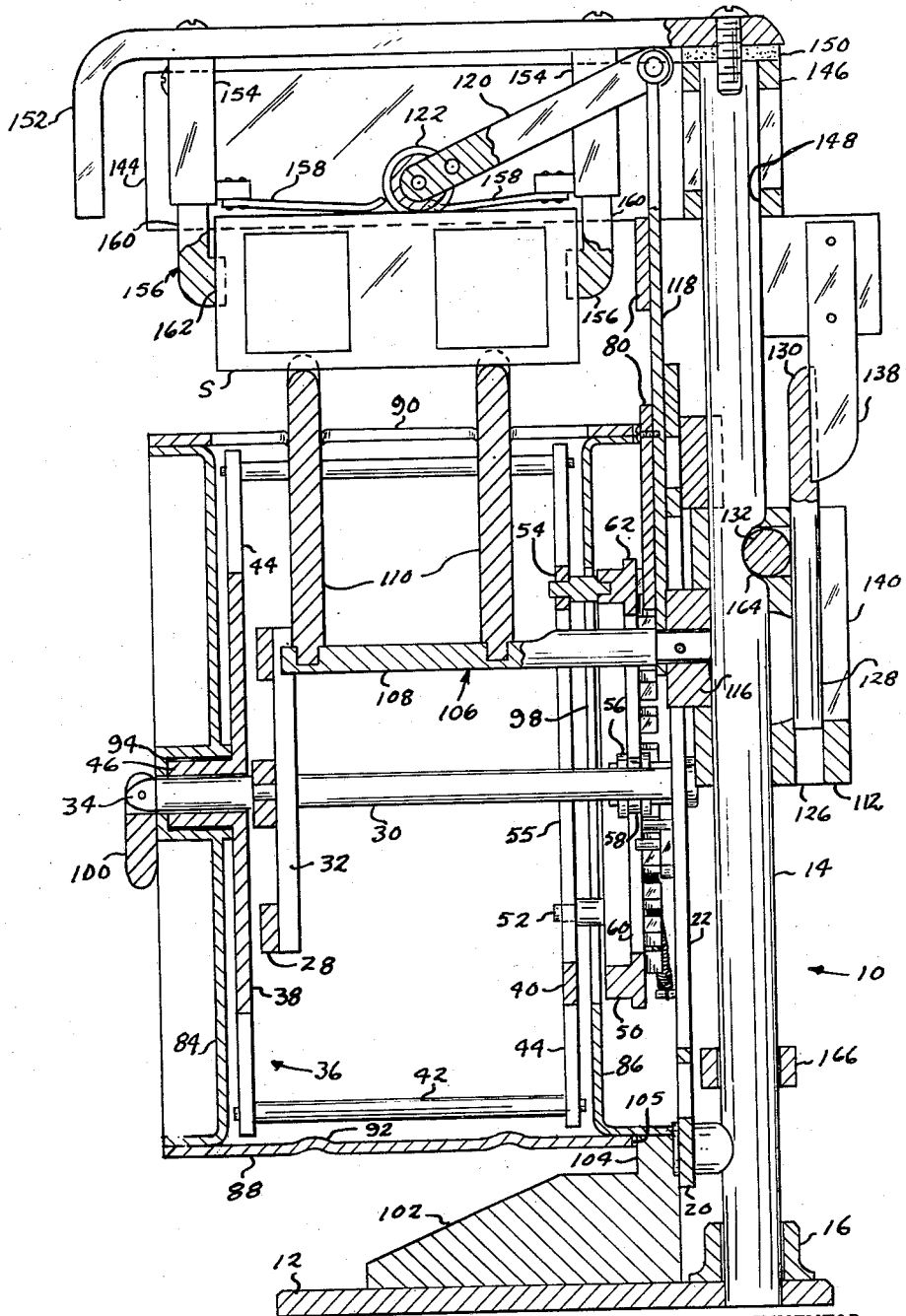
Figure 3 is a view similar to Figure 2, but with certain of the parts shown in a still different operating position.

Extending from the upright shaft 14 at right angles thereto is a pair of supporting studs 18, spaced vertically thereon, supporting a support plate 20, slotted as indicated at 22, in a parallel relation to the shaft 14 and spaced therefrom, as shown in Figures 1–3. The upper one of the supporting studs 18 is provided with an extension 24 having a rod 26 fixed thereto for a purpose as hereinafter described.

Horizontally spaced from the support plate 20, and in fixed relation thereto, a guide member 28 is supported by a pair of horizontally disposed rods 30 attached to the support plate 20, the guide member 28 being formed with a slot 32 extending vertically on the inner side of the guide member 28 facing the support plate 20 as shown in Figures 1–4.

A bearing stud 34 attached to the guide member 28 extends outwardly at right angles therefrom for supporting a hollow drum or cage type slide carrying magazine 36 for rotation relative thereto.

The slide carrying magazine 36 consists of axially spaced circular side plates 38, 40, interconnected by a number of pins 42 spaced circumferentially of the plates 38, 40 and extending therebetween, the side plates 38, 40, each being slotted radially about the periphery thereof to provide equidistantly spaced slots 44 for positioning stereo-slides therein as schematically shown at S. The magazine 36 is rotatively mounted on the bearing stud 34 by a hub 46 extending from the magazine plate 38 and over the bearing stud 34, the bearing stud 34 extending through an aperture 48 in the plate 38.

Figure 4:
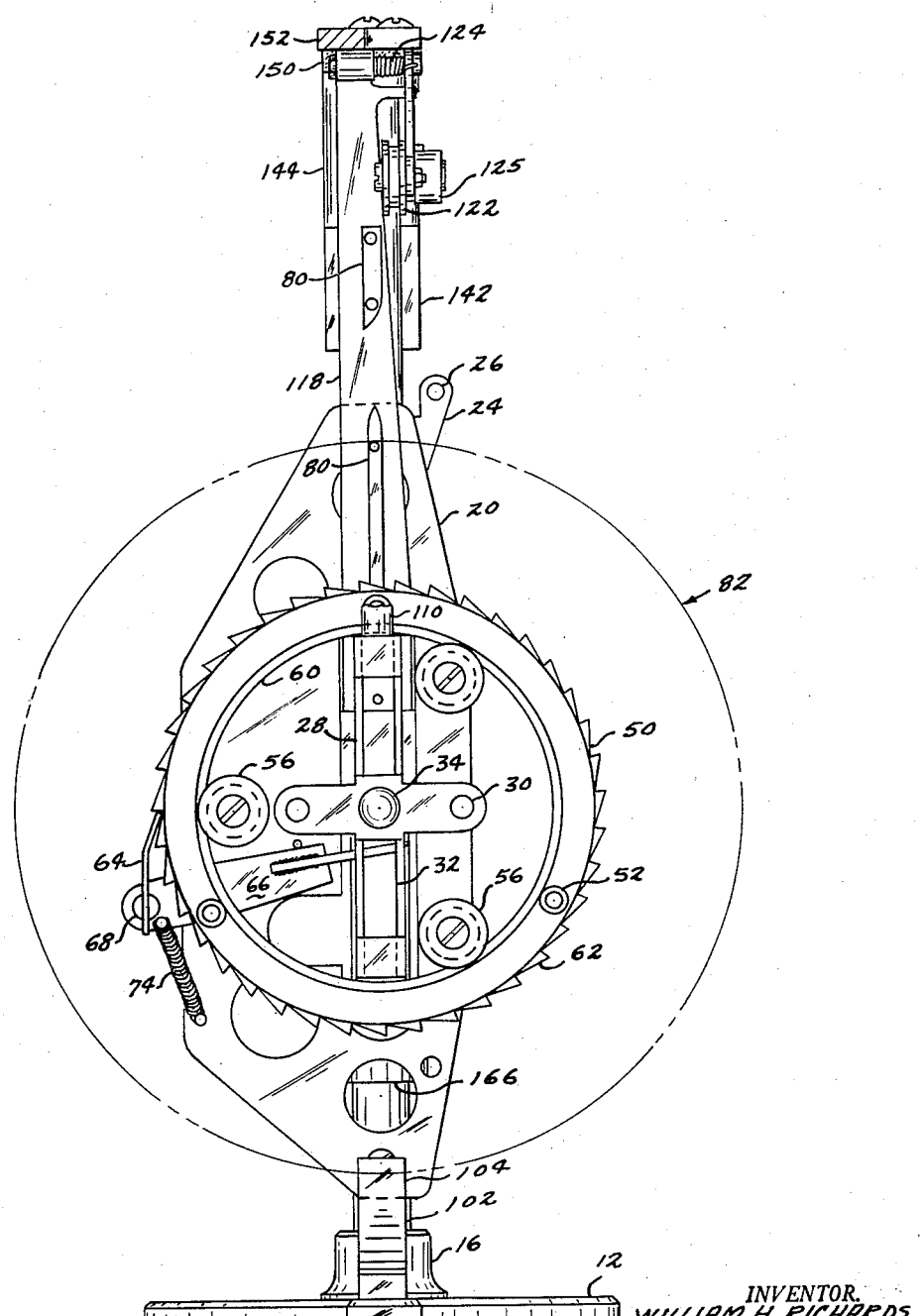
Figure 4 is a front elevation of the apparatus as shown in Figure 3, with omission of certain portions thereof for clarity.
Figure 5:
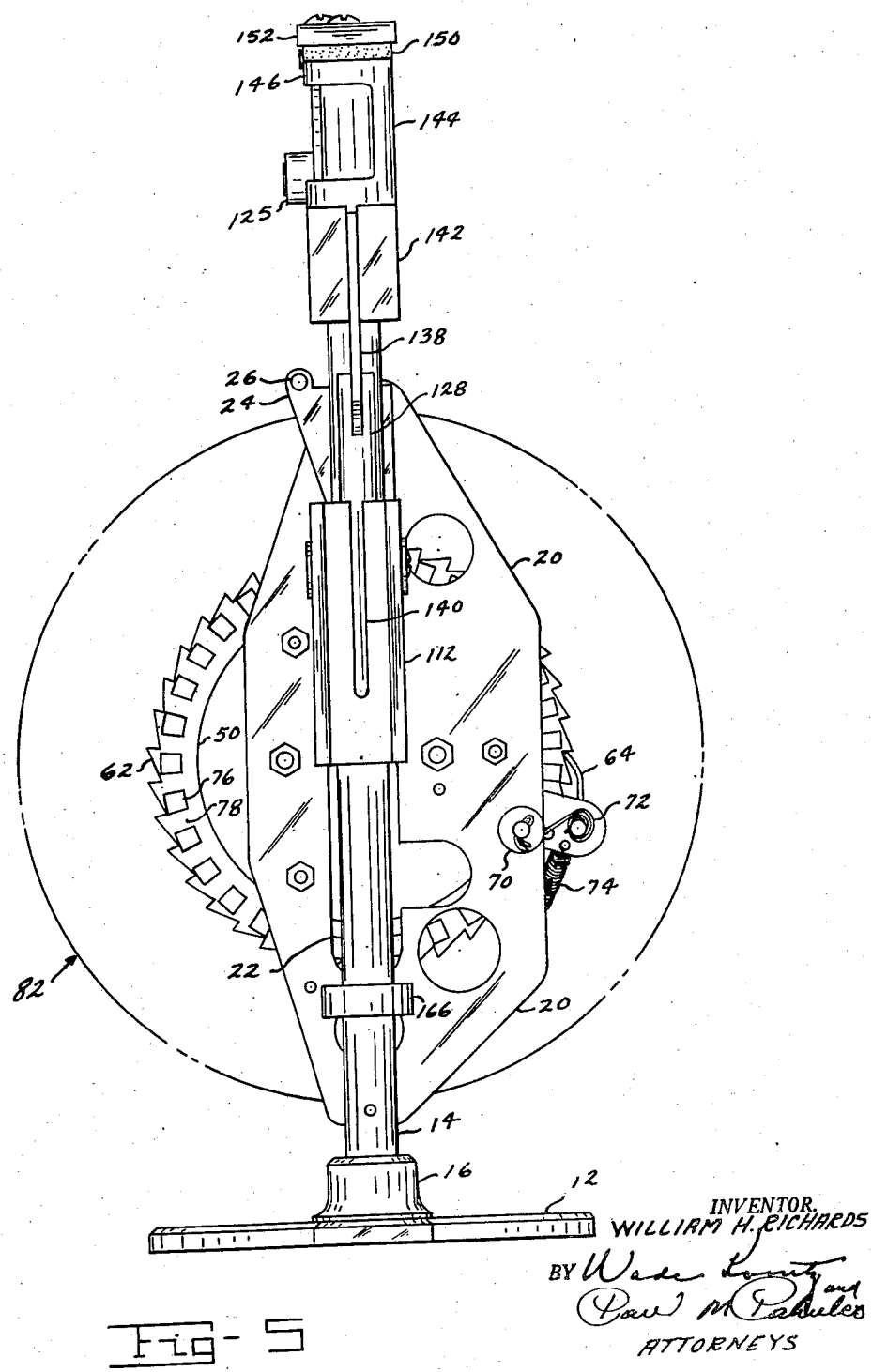
Figure 5 is a rear elevation of the apparatus as shown in Figure 4.

Successive rotation of the slide magazine 36 from slide to slide is effected by a ratchet ring 50 fixedly supporting the magazine 36 by pins 52 extending through opening 54 in the side plate 40 of the magazine 36 which is also formed with a circular opening 55. The ratchet ring 50 is rotatably supported on the support plate 20 by friction rollers 56 attached to the support plate 20, and each roller 56 having a circumferential groove 58 engaging a circular inner edge 60 of the ratchet ring 50 as shown in Figure 4. The ratchet ring 50 is also formed with ratchet teeth 62 arranged to be engaged by a pawl 64 pivoted on a lever 66 as indicated at 68 in Figures 1, 4 and 5. The lever 66 being pivotally mounted at 70 on the support plate 20 extends transversely of the ratchet ring 50 as shown in Figure 4.

A spring 72 attached to the pawl 64 and to the lever 66 biases the pawl 64 against the ratchet ring 50 to engage the teeth 62, whereby upon actuation of the lever 66 in a downward movement of the free end thereof, the pawl 64 engaging the teeth 62 will actuate the ratchet ring 50 to cause rotation of the magazine drum 36 to bring the slots 44 successively in position for the raising of the slides therein to a projection position.

A spring 74 attached to lever 66 and to the support plate 20 is arranged to pull the end of lever 66 on which the pawl 64 is pivoted downwardly so as to bring the pawl 64 in engagement with the next ratchet tooth 62 for causing successive rotation of the magazine drum 36.

The ratchet ring 50 is further provided with projections 76 on one side thereof, the projections 76 being equidistantly spaced adjacent the periphery of the magazine drum 36 forming index slots 78 corresponding to the drum slots 44, which slots 78 are arranged to be engaged by lock pins 80 for locking the ratchet ring 50 and, therefore, the magazine drum 36 in position during elevation of the slides S as hereinafter described.

Mounted in a concentric relation to and inclosing the magazine drum 36 on the bearing stud 34 is a stationary hollow drum type container 82 consisting of flanged circular side plates 84, 86, secured at their flanged portions to a tubular plate 88, as by welding, the tubular plate 88 being formed wtih a single slot 90 at the upper part thereof for passage of a slide therethrough to a projection position. Beads 92 on the tubular plate 88 are arranged to reduce friction between the slides S and the plate 88 during rotation of the magazine 36.

The container drum 82 is mounted on the bearing stud 34 in a fixed relation thereto by a hub 94 extending through an aperture 96 centrally of the plate 84 and over the magazine hub 46. A portion of the hub 94 at its outer end is in direct contact with the bearing stud 34 for permitting free rotation of the hub 46 therebetween. By this arrangement, the magazine drum 36 and the drum container 82 can be easily slipped off the bearing stud 34, the engagement of the hubs 46 and 94 retaining the magazine drum 36 and the container 82 in proper relationship so as to be easily slipped on again with the slightest effort. The opening 55 of the magazine plate 40 and a central opening 98 in the container plate 86 permit clearing of the guide member 28 during slipping of the magazine 36 and the container 82 on or off the bearing stud 34. The bearing stud 34 is also provided with a lock bar 100 pivoted on the end of the stud 34. On slipping the drums 36 and 82 on the bearing stud 34, the lock bar 100 which is axially extended as shown in Figure 2, can be pivoted downwardly into the position shown in Figure 1 to lock the drums 36 and 82 in place. The drum container 82 is further prevented from rotating and also supported in a level position by a plate 102 fixed to the platform 12 and having an extension 104 extending in a slot 105 formed in the lower flanged portion of the container 82 as shown in Figure 2.

Slidably mounted on the upright shaft 14 for reciprocation thereon is a slide lifting device, indicated generally by reference numeral 106, comprising a rod member 108 disposed at right angles to the shaft 14 and extending through the ratchet ring 50 and within the hollow drum type magazine 36, and a pair of slide engaging rod elements 110 fixed to the rod member 108 and disposed vertically at right angles thereto for alignment with a slide S positioned in one of the slots 44 arranged in line with the slot 90 of the container 82, whereby the slide S may be engaged at its lower edge by a slight notch in each of the elements 110 and be carried above the magazine 36 and the container 82 upon upward movement of the rod member 108 and, therefore, of the elements 110. Arranged to move upwardly with the rod member 108 are also the lock pins 80 for engaging the corresponding slots 78 to lock the magazine 36 in position against rotation during elevating of the slide from its slot by the elements 110 as previously described.

Adjacent the guide member 28, the rod member 108 is arranged to slidably engage the slot 32 extending vertically on the inner side of the guide member 28 and is guided thereby during movement thereof.

The slide lifting device 106 is slidably mounted on the upright shaft 14 for movement relative thereto by a carrier 112 having a longitudinally extending bore 114 slidably receiving the upright shaft 14. An extension 116 on the the side of the carrier 112 facing the magazine 36 and extending through the slot 22 firmly receives the rod member 108 whereby the rod member 108 with the slide engaging elements 110 may be effectively raised or lowered by movement of the carrier 112 along the shaft 14. A vertically extending thin plate 118 attached to the carrier extension 116 fixedly carries the lock pins 80, as shown in Figure 4, for movement therewith in order to lock the magazine 36 during the upward or downward stroke of the slide lifting device 106. The lock pins 80 vertically spaced from each other permit rotation of the magazine 36 only when the ratchet ring 50 is disposed in the space between the lock pins 80 during the downward movement of the carrier 112. At this position of the ratchet ring 50 and at the moment the lower of the lock pins 80 disengages from a slot 78 at the uppermost portion of the ring, the rod member 108 engages the free end of the lever 66 which actuates the panel 64 to engage one of the teeth 62 thereby causing the ratchet ring 50 to rotate. Upon completion of the ratchet ring rotation, the upper of the lock pins 80 enters the next adjacent slot 78, which has rotated to the uppermost position of the ring, and again locks the ratchet ring 50 and the magazine 36 in place against rotation.

At the upper end of the plate 118, and arm 120 pivotally inserted thereon and having a spool 122 at the free end thereof is biased downwardly by a spring 124. The spool 122 is arranged to engage the upper edge of a slide during elevation, and by pressing on the edge of the slide by the action of the spring 124, the slide is held in an erect position above the container 82 while supported on the slide engaging elements 110 as shown in Figure 3. The arm 120 is also provided with a roller 125 engaging the rod 26 thereby keeping the arm 120 and the spool 122 at a certain level above the container 82.

Slidably received in a second bore 126 extending adjacent and parallel to the bore 114 in the carrier 112, a guide pin 128 has a sloping surface 130 at its upper end bearing on a lock roller 132 swivelly held in a slot 134 communicating with both bores 114 and 126, the roller 132, also, bearing on the upright shaft 14. In this manner, the guide pin 128 is adapted to be locked in the carrier 112 by the roller 128 so as to prevent movement of the guide pin 128 wtih respect to the carrier 112. However, the carrier 112 with the guide pin 128 being locked therein may freely travel along the upright shaft 14 since the lock roller 132 is free to roll along the shaft 14. The lock roller 132 is retained in the slot 134 by a washer 136 attached at each end thereof.

An extension 138 attached to the guide pin 128 and projecting vertically above thereof is arranged to extend through a slot 140 in the side of the carrier 112 adjoining the bore 126. A handle 142 attached to the extension 138 and extending vertically therefrom may be grasped for operating the carrier 112 with the guide pin 128 locked therein to raise the lifting device 106 to bring the slide engaging elements 110 into engagement with a slide S in the slot 44 in the magazine 36 and carry the slide clear above the magazine 36 and container 82 to the projection position.

The slide S carried by the slide engaging elements 110 above the magazine 36 and container 82 to the projection position is adapted to be obscured by a shutter 144 having lugs 146 each formed with a bore 148 slidably receiving the upright shaft 14 and resting on the upper supporting stud 18 above the magazine 36 and container 82. The shutter 144 is arranged to be raised above a slide, placed in the projection position, by the handle 142 abutting the lower of the shutter lugs 146 and pushing the shutter upwardly so as to uncover the slide for projection thereof. In the upper position, the upper lug 146 of the shutter 144 abuts a washer 150 of flexible material secured on the top end of the upright shaft 14, above which washer 146 a bar 152 is attached to the shaft 14 so as to extend at right angles thereto. Extending downwardly from the bar 152 and spaced horizontally, a pair of bars 154 are each arranged to pivotally support an L-shaped slide holding member 156 having a flexible arm 158 extending substantially between the bars 154 and a vertically extending arm 160 provided with a V-shaped groove 162 in the inner space thereof. A stereo slide raised in the projection position by the rod elements 110 is arranged to be engaged by the slide holding member 156, as by pushing upwardly the flexible arms 158 causing the vertical arms 160 to move toward each other so as to engage the vertical edges of the slide by their V-shaped grooves 162. In this manner, each slide placed in the projection position is automatically aligned in all directions thereby preventing eye strain usually caused by misalignment of the slides during projection, especially, in three dimension projection.

The slide engaging elements 110 and, therefore, the carrier 112 are further adapted to be locked in this projection position of the slide, wherein the slide is obscured by the shutter 144, by a slot 164 on the upright shaft 14 spaced below the upper stud 18 and adapted to engage the lock roller 132 thereby locking the carrier 112 on the upright shaft 14 to prevent further upward movement of the carrier 112.

Engagement of the lock roller 132 with the slot 164 results in the release of the guide pin 128 from its locking engagement with the carrier 112, whereby the guide pin 128 may further be moved upwardly without the carrier 112 for picking up the shutter 144 by the handle 142 on the extension 138 engaging the lower lug 146 and raising the shutter 144 above the slide in the projection position as shown in Figure 3.

Return of the slide from its projection position to its slot in the magazine 36 for placing a new slide in the projection position is accomplished by grasping the handle 142 and moving the guide pin 128 downwardly so as to permit the shutter 144 to slide downwardly to its lower position, the shutter 144 coming to rest on the upper stud 18. At this point, as the guide pin 128 is further moved downwardly in the carrier 112, the sloping surface 130 of the guide pin 128 reaching the lock roller 132 in the slot 164 allows the roller 132 to fall out of the slot 164 and lock the guide pin 128 again in place in the carrier 112. This action of the lock roller 132 causes the carrier 112 to be released from its locked position on the shaft 14, which carrier 112 may further be moved downwardly, retracting the slide engaging elements 110 which carry the slide S back into its slot in the magazine 36, and come to rest on a collar 166 attached to the shaft 14.

Further movement of the carrier 112 downwardly, after the slide has been replaced in its slot, causes the plate 118, carrying the lock pins 80, to withdraw the lower pin 80 from its engagement with a slot 78 in the uppermost portion of the ratchet ring 50 and to release the magazine 36 from its locked position for rotation. As soon as the lock pin 80 is withdrawn from the slot 78, the rod member 108 contacts the lever 66 and pushes the end of the lever 66 downwardly causing the pawl 64, engaged with a tooth 62 of the ratchet ring 50, to rotate the magazine 36 to bring the next slot 44 with a slide therein in alignment with the slide engaging elements 110. Upon completion of the magazine rotation, the upper lock pin 80 enters the next slot 78, and the lever 66 is held in engagement with the rod member 108 as long as the carrier 112 remains in the down position in which the carrier 112 is supported by the stop collar 166 attached to the shaft 14. Upon upward movement of the carrier 112, the rod member 108 releases the lever 66 and the pawl 64 is moved downwardly by the pull of the spring 74 thereby engaging the next tooth 62 of the ratchet ring 50 for repeating the same operation.

A new slide may now be placed in the projection position by repeating the cycle of operation of the stereo-slide transport mechanism of the present invention.

The present invention has been described in detail above for purposes of illustration only and is not intended to be limited by this description or otherwise except as defined in the appended claims.

I claim:

1. A slide transport apparatus comprising an upright member mounted on a platform, a bearing member extending at right angles to said upright member in fixed relation thereto, a hollow drum type slide carrying magazine mounted on said bearing member for rotation relative thereto having equidistantly spaced slots about its periphery adapted to receive slides therein, a slide lifting device extending within said magazine in parallel relation to said bearing member having slide engaging elements disposed at right angles thereto for alignment with a slide in a slot in said magazine, a carrier connected to said slide lifting device slidably mounted on said upright member, a guide pin slidably extending through a bore in said carrier, lock roller means mounted in said carrier in bearing engagement with said upright member and said guide pin for locking said guide pin in said carrier while permitting free movement of said carrier on said upright member, and handle means on said carrier for moving said carrier and said slide lifting device upwardly along said upright member to bring said slide engaging elements into engagement with a slide in a slot in said magazine and carry the slide clear of said magazine.

2. A structure as set forth in claim 1, and slide supporting means secured to said carrier and disposed above said magazine, said slide supporting means operatively associated with said slide engaging elements for engaging a slide thereby supporting the slide in an erect position above said magazine.

3. A structure as set forth in claim 2, and slide aligning means mounted on said upright member and disposed above said magazine for engaging a slide elevated above said magazine into a projection position thereby aligning the slide with respect to its vertical plane to prevent distortion during projection.

4. A structure as set forth in claim 1 and said handle means including an extension on said guide pin in parallel relation to said upright member, said upright member provided with support means and groove means in vertical spaced relation to each other, said support means adapted to support a shutter in slidable engagement with said upright member for obscuring the slide carried clear of said magazine into a projection position, said carrier adapted to be locked to said upright member to prevent further upward movement thereof by engagement of said roller means with said groove means, and said guide pin released for further upward movement independently of said carrier by the engagement of said roller means with said groove means, whereby said guide pin may be further advanced upwardly so that said handle means may engage the shutter and push the shutter to a position above the projection position of the slide, said handle means holding the shutter above the projection position of the slide during projection of the slide.

5. A structure as set forth in claim 4 and slide carrying magazine actuating means operatively associated with said magazine and said slide lifting device, whereby upon retraction of said guide pin into said carrier, said roller means will disengage said groove means, and said slide lifting device in its downward movement will engage said magazine actuating means to rotate said magazine to bring the following slot with a slide therein into the plane of said slide engaging elements.

References Cited in the file of this patent

UNITED STATES PATENTS

| 24,327 | Perry | June 7, 1859 |
|---|---|---|
| 788,470 | Jehn | Apr. 25, 1905 |
| 1,069,521 | Bernard | Aug. 5, 1913 |
| 1,161,660 | Guerzoni et al. | Nov. 23, 1915 |
| 1,349,640 | Trueblood | Aug. 17, 1920 |

FOREIGN PATENTS

| 565,336 | France | Nov. 6, 1923 |